United States Patent
Waibel

(10) Patent No.: US 6,754,969 B2
(45) Date of Patent: Jun. 29, 2004

(54) SELF-LEVELING CONSTRUCTIONAL LASER

(75) Inventor: Reinhard Waibel, Berneck (CH)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 10/243,250

(22) Filed: Sep. 12, 2002

(65) Prior Publication Data

US 2003/0061720 A1 Apr. 3, 2003

(30) Foreign Application Priority Data

Sep. 28, 2001 (EP) .............................................. 01810947

(51) Int. Cl.$^7$ .............................................. G01C 15/10
(52) U.S. Cl. ..................... 33/281; 33/DIG. 21; 33/283; 33/291
(58) Field of Search ........................... 33/281–286, 227, 33/291, DIG. 21

(56) References Cited

U.S. PATENT DOCUMENTS

| 5,537,205 A | * | 7/1996 | Costa et al. | ........... 33/DIG. 21 |
| 5,539,990 A | * | 7/1996 | Le | ................................. 33/283 |
| 5,621,975 A | * | 4/1997 | Rando | .......................... 33/227 |
| 5,782,002 A | * | 7/1998 | Reed | ............................. 33/265 |
| 5,912,733 A | * | 6/1999 | Dunlop et al. | ................. 33/286 |
| 5,983,510 A | * | 11/1999 | Wu et al. | ....................... 33/227 |
| 6,625,895 B2 | * | 9/2003 | Tacklind et al. | ............... 33/286 |
| 2002/0083603 A1 | * | 7/2002 | Jang | .............................. 33/281 |

* cited by examiner

Primary Examiner—Diego Gutierrez
Assistant Examiner—Yaritza Guadalupe
(74) Attorney, Agent, or Firm—Sidley Austin Brown & Wood, LLP

(57) ABSTRACT

A constructional laser including a self-leveling optical system located in the laser housing (2) and generating a visible plumb light beam (5a) and/or visible horizontal light beam (5b), and a stand (7) fixedly secured to the housing (2) for mounting the housing on a bearing support (6), with the stand (7) being continuously pivotable about a pivot axis (A) transverse to the light beam (5a, 5b) in an angular region (↑) of greater than (20°) and discretely pivotable in angular steps encompassing the self-leveling region (a) and locable in its pivotal position.

9 Claims, 1 Drawing Sheet

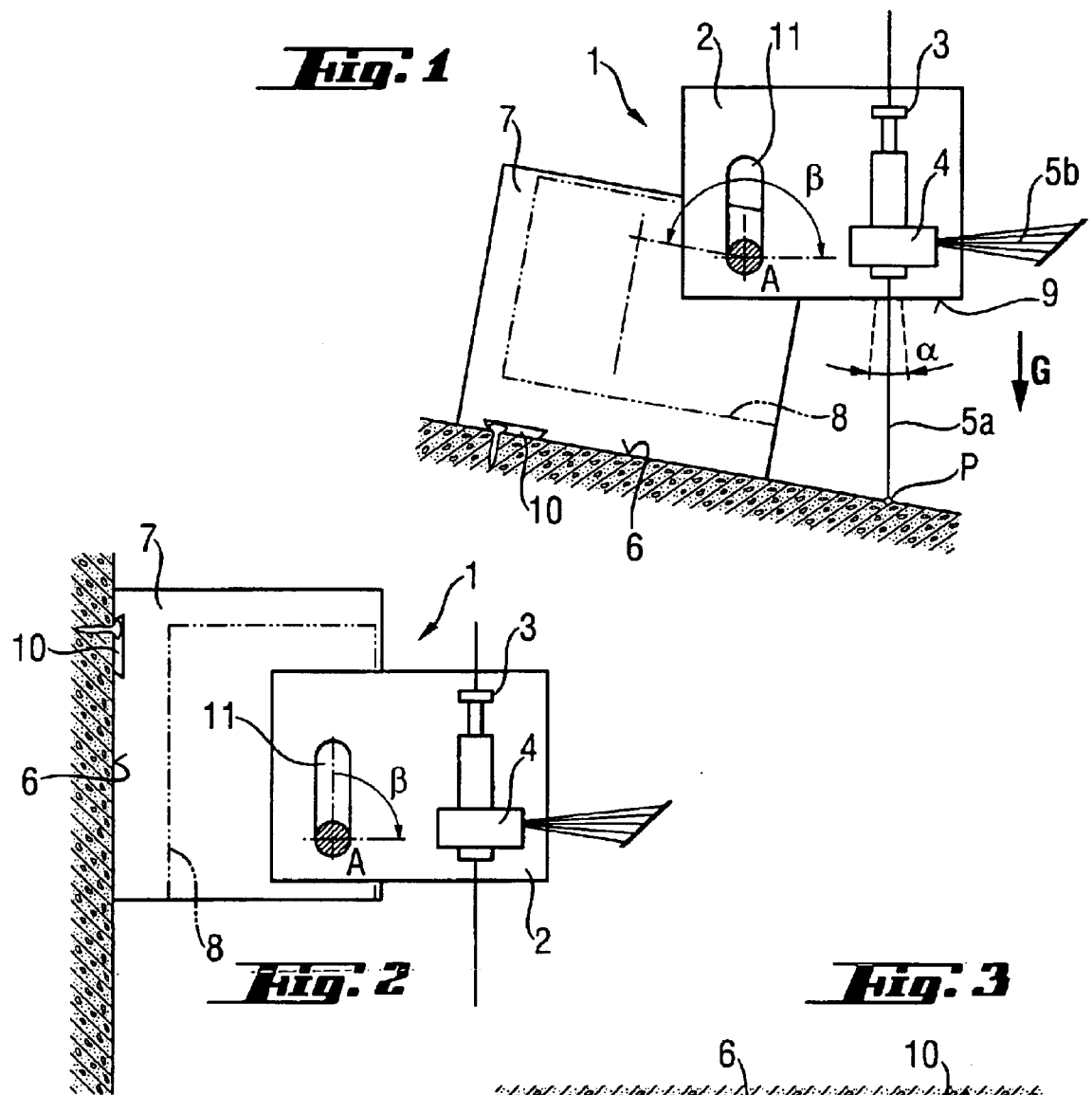
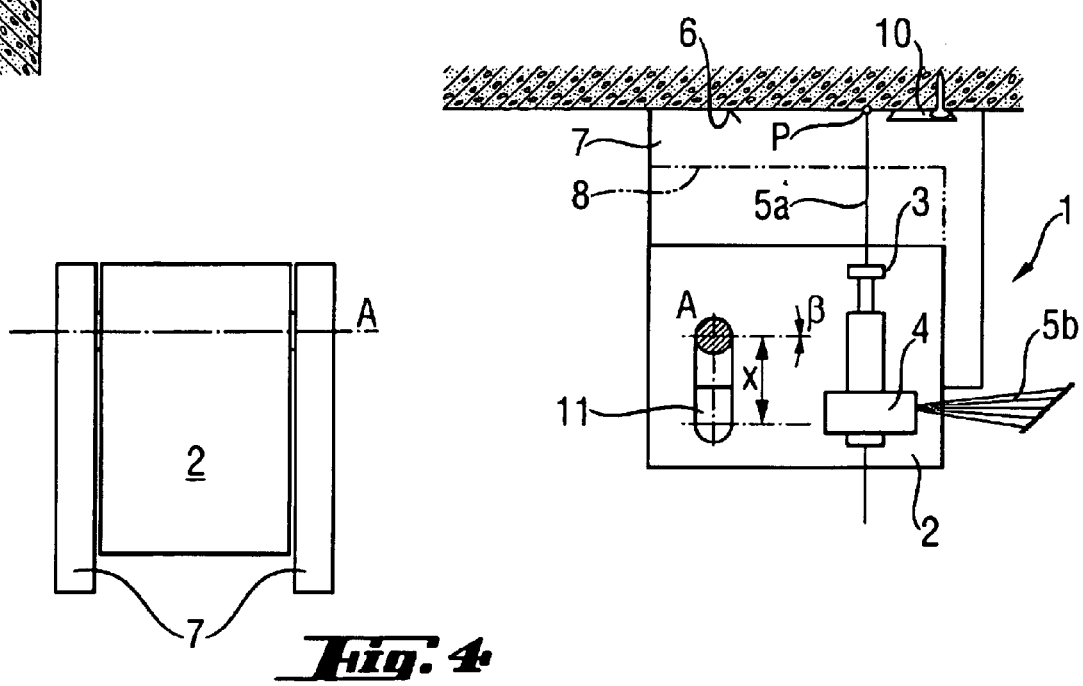

SELF-LEVELING CONSTRUCTIONAL LASER

BACKGROUND OF THE INVENTION

1. Field of the Invention

The present invention relates to a self-leveling constructional laser for generating an optical plumb or leveling beam.

2. Description of the Prior Art

Generally, a constructional laser, which is capable of self-leveling, under action of a gravity force, in a limited self-leveling region of about ±5°, includes a housing, and a rotably and substantially fictionlessly securable in the housing, self-leveling electrooptical system for generating a vertical and/or horizontal, punctual and/or linear visible laser beam.

In distinction from the precision measuring technology, in the ragged environment of the construction industry, accessory-free, one-piece constructional lasers with compact housings and, if necessary, shock-absorbing, are used. An often need to use a constructional laser on steeply inclined supports and directly on walls and ceilings usually leads to the use of temporary auxiliary constructions to provide slightly inclined supports for supporting a constructional laser. Stands and other auxiliary equipment are not always immediately available or are lost.

U.S. Pat. No. 3,909,952 discloses a plumb light that should be manually leveled on a slightly inclined support with the use of box levels. The plumb light includes a light source pivotable within an angle of 0–90°.

The Japanese Publication SP-IO 160471 discloses a compact plumb laser for the constructional industry that can temporary be mounted on a wall or a ceiling.

U.S. Pat. No. 5,012,585 discloses a self-leveling constructional laser that includes attachment means fixedly secured on the housing for using the laser on a floor or a wall.

U.S. Pat. No. 5,784,793 discloses a self-leveling constructional laser including a template for supporting the housing on a floor and that provides for self-leveling of the electrooptical system.

U.S. Pat. No. 5,144,487 discloses an optional stand for mounting the laser on a steeply inclined support. A laser beam, which is directed onto the support, is freely visible from an exit window offset with respect to the bearing surface.

The object of the present invention is to provide a constructional laser for use in the ragged environment of the constructional industry and which can be easily mounted on a steeply inclined support and directly on a wall or a ceiling.

SUMMARY OF THE INVENTION

This and other objects of the present invention, which will become apparent hereinafter, are achieved by providing a self-leveling constructional laser including a housing, an electrooptical system for generating visible plumb light beam and/or visible horizontal light beam which is firmly focused at least in one direction. The electrooptical system is located in the laser housing and is self-aligning under a gravity force within a self-leveling region. The laser further includes a stand fixedly secured to the housing for mounting the housing on a bearing support, with the stand being continuously pivotable about a pivot axis transverse to the light beam in an angular region of greater than 20° and/or being discretely pivotable in angular steps encompassing the self-leveling region and with the stand being locable in its pivotal position.

By providing a stand fixedly secured to the housing, pivotable in a large angular region, and securable in its pivotal position, it became possible mount the laser on a steeply inclined support, a wall, and/or ceiling, with a preliminary rough leveling by sight up to the self-leveling region.

Advantageously, the angular region is so selected that it is greater than 90°, preferably is a multiple of 90° up to a full circle, i.e., up to 360°. Such angular region permits to mount the laser on a wall or a ceiling.

Advantageously, the pivot axis is supported in a spaced relationship to a center point of two opposite side surfaces of the housing. This permits to achieve a change of a position of a respective lower side surface with respect to the support upon pivoting of the housing out by 180°, with the stand being supported on the support.

With the pivoting of the housing from a laser transportation position into a laser use position, the lower side surface becomes continuously free-lying and, with the impact point of the laser beam on the support being clearly visible, the light beam itself can be used for a simple and precise positioning of the laser. Advantageously, the pivot axis is supported in the housing with a possibility of a limited displacement therein, whereby the distance between the visible impact point on the support and the side surface can be increased so that the visibility of the impact point is improved.

Advantageously, the stand is frictionlessly and selflockingly connected with the housing. This permits to easily stop the preliminary leveling.

Advantageously, the stand is arranged along the pivot axis on opposite sides of the housing, so that the stands at the same time, forms a protective frame against an obtuse impact loading.

Advantageously, the stand is plate-shaped on one or both sides in a plane transverse to the pivot axis and, advantageously, covers the housing in at least one pivotal position of the stand along the pivot axis, forming a protection plate against a pointed impact loading.

Advantageously, the stand is formed of a formstable, impact-resistant, energy-absorbing material such as, e.g., hard rubber or plastics. With such a material, any impact dissipates in this material.

Advantageously, the stand is provided with attachment means, such as a sleeve with an inner thread, for temporary mounting the stand on a support.

The novel features of the present invention, which are considered as characteristic for the invention, are set forth in the appended claims. The invention itself, however, both as to is construction and its mode of operation, together with additional advantages and objects thereof, will be best understood from the following detailed description of preferred embodiments, when read with reference to the accompanying drawings.

BRIEF DESCRIPTION OF THE DRAWINGS

The drawings show:

FIG. 1 a schematic view of a constructional laser according to the present invention secured on an inclined surface;

FIG. 2 a schematic view of the laser shown in FIG. 1 but secured to a vertical wall;

FIG. 3 a schematic view of the laser shown in FIG. 1 but secured to a ceiling; and FIG. 4 shows a schematic view of a laser stand.

DETAILED DESCRIPTION OF PREFERRED EMBODIMENT

A self-leveling laser 1, which is shown in FIG. 1, includes a compact housing 2 and an electro-optical system 4 suspended in the housing 2 by a pendulum suspension 3. The electro-optical system 4 self-straightens by the gravity force G within a self-leveling region α relative to the housing 2. The electro-optical system 4 generates two light beams a plumb, punctually focused, visible light beam 5a and a horizontal, linearly focused in a sector, visible light beam 5b. For mounting the laser 1 on a steeply inclined bearing support 6, the laser 1 is provided with a stand 7 fixedly secured to a side of the laser housing 2. The housing 2 pivots about an axis A in an angular region β of about 180° from its transportation position 8, in which the plate-shaped stand 7 covers the housing, to its use position. The axis A is supported in the housing 2 in an elongate opening 11 which provides for a limited displacement of the axis A. The housing 2 pivots transverse to the light beams 5a, 5b. The pivot axis A, which is spaced from a side center point of the housing 2, insures that the lower side surface 9 lies free, and the light beam 5a, which propagates through the lower side surface 9, is visible in the impact point P of the bearing support 6.

In FIG. 2, the laser 1 is secured with a nail, which is located in an undercut that forms attachment means 10, to a wall that defines the bearing support 6. Here, the pivotal angular region β amounts to 90°.

In FIG. 3, the laser 1 is secured with a nail, which is located in an undercut that forms the attachment means 10, to a ceiling that defines the bearing support 6.

In FIG. 3, the housing 2 is displaced, with respect to the stand 7, by a distance X so that the pivotal angual region β amounts to about 0°.

The stand 7, which is shown in FIG. 4, is arranged, with respect to, the pivot axis A, on opposite sides of the housing 2. The stand 7 is formed of a hard rubber.

Though the present invention was shown and described with references to the preferred embodiment, such is merely illustrative of the present invention and is not to be construed as a limitation thereof, and various modifications to the present invention will be apparent to those skilled in the art. It is, therefore, not intended that the present invention be limited to the disclosed embodiment or details thereof, and present invention includes all of variations and/or alternative embodiments within the spirit and scope of the present invention as defined by the appended claims.

What is claimed is:

1. A constructional laser for generating at least one of optical plumb beam and leveling beam, comprising a housing (2); an electro-optical system (4) for generating at least one of visible plumb light beam (5a) and visible horizontal light beam (5b) and which is firmly focused at least in one direction, the electro-optical system (4) being located in the housing (2) and being self-aligning relative to the housing (2) under a gravity force G within a self-leveling region (α); and a stand (7) fixedly secured to the housing (2) for mounting the housing on a bearing support (6), the stand (7) being at least one of continuously pivotable about a pivot axis (A) transverse to the light beam (5a, 5b) in an angular region (β) of greater than (20°) for rough leveling of the housing (2) with respect to the support and discreetly pivotable in angular steps encompassing the self-leveling region (α), and lockable in a pivotal position thereof, and wherein the pivot axis (A) is spaced from a center point of two opposite side surfaces of the housing (2) and lies in a plane extending transverse to the opposite side surfaces of the housing.

2. A constructional laser according to claim 1, wherein the angular region (β), is greater than 90°.

3. A constructional laser according to claim 2, wherein the angular region (β), is a multiple of 90° and up to 360°.

4. A constructional laser according to claim 1, wherein the pivot axis (A) is supported in the housing (2) for a limited displacement therein.

5. A constructional laser according to claim 1, wherein the stand (7) is frictionally and self-lockingly connected with the housing (2).

6. A constructional laser according to clam 1, wherein the stand (7) is arranged along the pivot axis (A) on opposite sides of the housing (2).

7. A constructional laser according to claim 1, wherein the stand (7) is formed of formstable, impact-resistant, energy-absorbing material.

8. A constructional laser according to claim 1, wherein the stand (7) comprises attachment means (10) for temporary mounting of the laser on the bearing support (6).

9. A constructional laser for generating at least one of optical plumb beam and leveling beam, comprising a housing (2); an electro-optical system (4) for generating at least one of visible plumb light beam (5a) and visible horizontal light beam (5b) and which is firmly focused at least in one direction, the electro-optical system (4) being located in the housing (2) and being self-aligning under a gravity force (G) within a self leveling region (α); and a stand (7) fixedly secured to the housing (2) for mounting the housing on a bearing support (6), the stand (7) being at least one of continuously pivotable about a pivot axis (A) transverse to the light beam (5a, 5b) in an angular region (β) of greater than (20°) and discreetly pivotable in angular steps encompassing the self-leveling region (α), and locatable in a pivotal position thereof, wherein the stand (7), in a plane transverse to the pivot axis (A), is plate-shaped on one of one side and both sides, and wherein the stand (7) covers the housing (2) in at least one pivotal position thereof.

* * * * *